US006854813B2

(12) United States Patent
Yokoyama et al.

(10) Patent No.: US 6,854,813 B2
(45) Date of Patent: Feb. 15, 2005

(54) ELECTRICALLY DRIVEN BRAKE DEVICE AND CONTROL APPARATUS THEREOF

(75) Inventors: Atsushi Yokoyama, Chiyoda (JP);
Takaomi Nishigaito, Chiyoda (JP);
Yuzo Kadomukai, Ishioka (JP);
Masanori Ichinose, Tsukuba (JP);
Kenichiro Matsubara, Chiyoda (JP);
Nobuyuki Ueki, Sagamihara (JP);
Toshio Manaka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 180 days.

(21) Appl. No.: 10/047,106

(22) Filed: Jan. 17, 2002

(65) Prior Publication Data

US 2003/0030322 A1 Feb. 13, 2003

(30) Foreign Application Priority Data

Aug. 7, 2001 (JP) ........................................ 2001-238583

(51) Int. Cl.[7] ............................................... B60T 8/88
(52) U.S. Cl. ..................................... 303/122.04; 303/20
(58) Field of Search ...................... 303/122.04, 122.05, 303/20

(56) References Cited

U.S. PATENT DOCUMENTS

| 4,345,796 A | * | 8/1982 | Reinecke ............... 303/122.06 |
| 4,938,542 A | * | 7/1990 | Kline et al. ................... 303/20 |
| 5,129,713 A | | 7/1992 | Matsuda |
| 5,957,551 A | * | 9/1999 | Maron et al. ................ 303/191 |
| 5,961,190 A | * | 10/1999 | Brandmeier et al. ........ 303/152 |
| 5,962,931 A | * | 10/1999 | Maron et al. ................ 307/125 |
| 6,088,638 A | * | 7/2000 | Behrends et al. ............. 701/43 |
| 6,189,981 B1 | * | 2/2001 | Niedermeier ................ 303/20 |
| 6,296,325 B1 | * | 10/2001 | Corio et al. .................. 303/20 |
| 6,299,261 B1 | * | 10/2001 | Weiberle et al. .............. 303/20 |

FOREIGN PATENT DOCUMENTS

| DE | 35 02 100 A1 | 7/1986 |
| EP | 1 283 139 A2 | 2/2003 |
| JP | A-11-171006 | 6/1999 |
| WO | 01/62569 A1 | 8/2001 |

OTHER PUBLICATIONS

Huang et al., "Automotive Electrical System in the New Millennium," *Society of Automotive Engineers*, SAE Paper No. 1999–01–3747, pp. 1–8, 1999.

* cited by examiner

*Primary Examiner*—Robert Siconolfi
(74) *Attorney, Agent, or Firm*—Antonelli, Terry, Stout & Kraus, LLP

(57) ABSTRACT

An electrically driven brake device includes a plurality of brake actuators for generating braking force when driven electrically, a power supply source for storing electric energy and supplying power to the brake actuators, a power source line for connecting the power supply source and the brake actuators, and a power breaker at a position of the power source line at which the brake actuators can be insulated and separated into at least two systems.

20 Claims, 6 Drawing Sheets

ELECTRICALLY DRIVEN BRAKE DEVICE AND CONTROL APPARATUS THEREOF

BACKGROUND OF THE INVENTION

This invention relates to an electrically driven brake device to be mounted to a vehicle, which brake device generates braking force by using power supplied from a power supply source.

An electrically driven brake device that operates electric motors by electric power and electric signals and generates braking force is known in the past. The electrically driven brake device proposed in JP-A-11-171006, for example, includes brake actuators that generate braking force when driven electrically. This brake device can generate suitable braking force in accordance with a depression quantity of a brake pedal. The brake actuator of this device includes a main battery and an auxiliary battery as power supply sources, and uses the auxiliary battery as the power supply source when the main battery is consumed. Consequently, the brake device can always exhibit braking force characteristics having excellent response.

SUMMARY OF THE INVENTION

To reliably acquire braking force required by a driver, it is necessary to supply electric power capable of always securing sufficient braking force to brake actuators. In the conventional brake device described above, however, electric power cannot be supplied to all the brake actuators when any abnormality develops in a relay unit that switches the main battery and the auxiliary battery, and sufficient braking force cannot be secured from time to time. Therefore, the problem remains yet to be solved in that sufficient electric power cannot be supplied to the brake actuators when abnormality develops in the electric power supply system of the electrically driven brake device.

In view of the problem with the prior art described above, the present invention aims at providing an electrically driven brake device capable of supplying sufficient electric power to brake actuators even when any abnormality develops in a power supply system and having high reliability, and a control apparatus of the brake device.

According to one aspect of the present invention, an electrically driven brake device includes a power breaker capable of insulating and separating a plurality of brake actuators into two systems. Since the power source system in which abnormality develops can thus be insulated and separated from the normal power source system, the present invention can accomplish an electrically driven brake device having high reliability, and also a control apparatus of the brake device.

According to the second aspect of the present invention, an electrically driven brake device includes a plurality of power supply sources and a power breaker capable of insulating and separating a plurality of brake actuators into two separate systems. Therefore, even when any abnormality develops, the power source system in which such abnormality occurs can be separated, and the power source system to which at least one of the power supply sources is connected is left, and an electrically driven brake device having higher reliability can be accomplished.

According to the third aspect of the present invention, an electrically driven brake device includes a cutoff switch for separating a power source line into a first power source line and a second power source line, a first voltage detection circuit for detecting a voltage of the first power source line, and a second voltage detection circuit for detecting a voltage of the second power source line, wherein the second power source line supplies driving power to the first voltage detection circuit and the first power source line supplies driving power to the second voltage detection circuit. Even when abnormality develops in the power source line, therefore, the cutoff switch cuts off the power source line and driving power is supplied from the power source line on the normal side to the voltage detection circuit that detects the voltage of the power source line on the abnormal side. Consequently, voltage detection can be continued. Because the cutoff state can be released as soon as abnormality is eliminated, an electrically driven brake device having higher reliability can be accomplished.

According to the fifth aspect of the present invention, the power breaker includes a switch that conducts electrical connection/cutoff control and a switch that is fused by thermal energy, at series positions on the power source line. Even when the switch for conducting electrical connection/cutoff control does not operate as expected, the switch that is fused by thermal energy cuts off the power source line. Therefore, an electrically driven brake device having higher reliability can be accomplished.

According to the sixth aspect of the present invention, the voltage of one of the power supply sources can be generated by a plurality of power supply sources having voltages higher than the voltage of the other power supply source and a power breaker capable of insulating and separating the brake actuators into two systems. Therefore, in an electrically driven brake device including brake actuators driven at a higher voltage than the driving voltage of devices other than the brake actuators, the present invention can accomplish an electrically driven brake device capable of stably supplying electric power to both of the devices other than the brake actuator, and the brake actuators, and having higher reliability.

According to the seventh aspect of the present invention, an electrically driven brake device includes a secondary power breaker having a smaller current value than a current value as a power cutoff condition of the power breaker described above, on a secondary power source line. When any abnormality develops between the secondary power breaker and the brake actuators, the secondary power source line in which such abnormality occurs can be insulated and separated from the main power source line, and the drop of braking performance of the vehicle can be suppressed. Accordingly, the present invention can accomplish an electrically driven brake device having high reliability.

DESCRIPTION OF THE EMBODIMENTS

Hereinafter, an automatic brake device according to preferred embodiments of the present invention will be explained with reference to the accompanying drawings.

Figure 1:
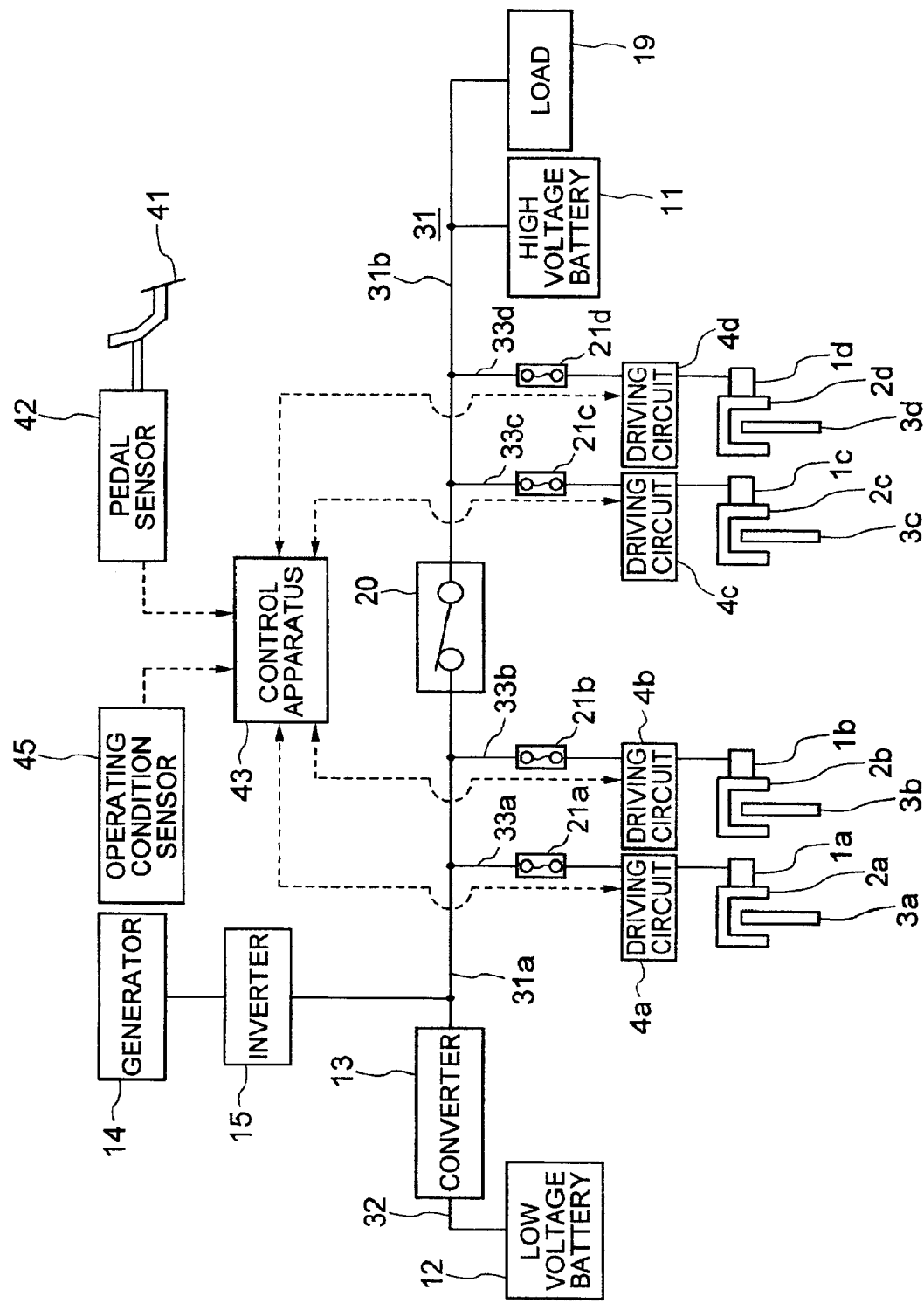
FIG. 1 is a system structural view of an electrically driven brake device according to a first embodiment of the present invention.

FIG. 1 is a system structural view of the electrically driven brake device according to the first embodiment of the present invention.

The electrically driven brake device according to this embodiment includes a control apparatus 43. The control apparatus 43 is an electronic controller for controlling braking force of a vehicle, that includes a microcomputer, a memory for storing a control program and data and an input/output circuit for controlling input/output of signals to and from outside.

The electrically driven brake device includes disk rotors 3a, 3b, 3c and 3d. (Reference numerals each having a suffix will be hereinafter represented by suffixes a to d). The disk rotor 3a rotates with a right front wheel and the disk rotor 3b, with a left front wheel. The disk rotor 3c rotates with a right rear wheel and the disk rotor 3d, with a left rear wheel. Alternatively, the disk rotor 3a rotates with the right front wheel, the disk rotor 3b, with the left rear wheel, the disk rotor 3c with the left front wheel and the disk rotor 3d, with the right rear wheel. The vehicle can be decelerated without drastically losing straight driving stability provided that the braking force of at least two wheels of the vehicle, moreover, the braking force of at least one right wheel and at least one left wheel, can be secured. Therefore, the vehicle can be decelerated without drastically losing straight driving stability provided that the braking force of the disk rotors 3a and 3b, or the braking force of the disk rotors 3c and 3d, for example, can be secured.

Electrically driven calipers 2a to 2d are arranged in the proximity of the disk rotors 3a to 3d, respectively. These caliper 2a to 2d respectively include brake pads (not shown) disposed on both surfaces of the disk rotors 3a to 3d and brake motors 1a to 1d for generating clamp force that pushes the brake pads towards the surface of the disk rotors 3a to 3d. The brake motors 1a to 1d and the electrically driven calipers 2a to 2d respectively constitute brake actuators.

A driving circuit 4a to 4d is connected to each brake motor 1a to 1d. The driving circuit 4a to 4d is the circuit that supplies power corresponding to an instruction signal given from the control apparatus 43 to the brake motor 1a to 1d. Each brake motor 1a to 1d generates the clamp force corresponding to power supplied from the driving circuit 4a to 4d.

A secondary power source line 33a to 33d is connected to each driving circuit 4a to 4d. A secondary power breaker 21a to 21d for controlling switching of a connection/cutoff state is connected to an intermediate part of each secondary power source line 33a to 33d. The secondary power source line 33a to 33d is connected to the main power source line 31. The secondary power breaker 21a to 21d is a fuse that is cut off when a predetermined overcurrent flows, for example.

A high voltage battery 11 is connected to the main power source line 31. The high voltage battery 11 is the power supply source that stores power and supplies power to the driving circuit 4a to 4d. The high voltage battery 11 is a 36 V battery, for example. The 36 V voltage is a DC voltage that is safe to the human body, and can be outputted by an economical lead battery.

A main power breaker 20 for controlling switching of a connection/cutoff state is disposed on the main power source line 31. The main power source line 31 includes a main power source line 31a to which the secondary power source lines 33a and 33b are connected and a main power breaker 20 that connects the main power source line 31a to the main power source line 31b. The main power breaker 20 is an electronic control switch for controlling connection/cutoff of a built-in relay switch in accordance with a current value or voltage value detected, for example.

Figure 6:
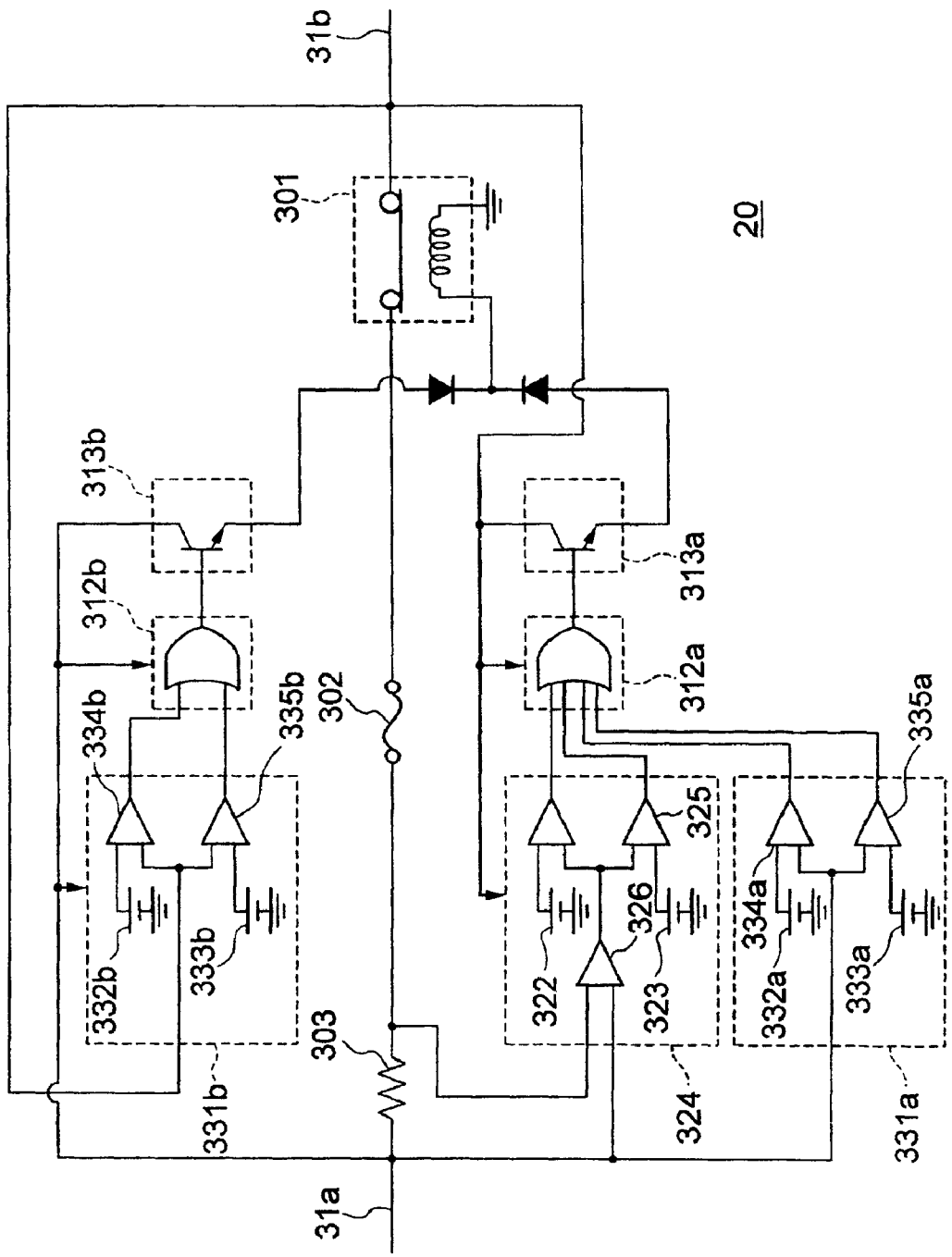
FIG. 6 is a circuit diagram of the main power breaker 20.

The main power breaker 20 is, for example, an electronic control switch, shown in FIG. 6, for controlling connection/cutoff of a built-in relay switch in accordance with a current value or voltage value detected. The main power breaker 20 includes a relay switch 301 for electrically controlling a connection/cutoff state, a fuse 302 that is fused by thermal energy, a resistor 303 for measuring a current of the main power source line 31, a current detection circuit 321 for detecting a current value I20 of the main power source line 31, a voltage detection circuit 331a for detecting a voltage value of the main power source line 31a, a voltage detection circuit 331b for detecting a voltage line of the main power source line 31b, a cutoff judgment circuit 312a for executing cutoff judgment in accordance with the detection result of both current detection circuit 321 and voltage detection circuit 31a, a transistor 313a for applying a current to the relay switch 301 in accordance with the judgment of the cutoff judgment circuit 312a, a cutoff judgment circuit 312b for executing cutoff judgment in accordance with the detection result of the voltage detection circuit 331b, and a transistor 313b for applying a current to the relay switch 301 in accordance with the judgment result of the cutoff judgment circuit 312b.

The difference of the voltage values that change in accordance with the current value I20 flowing through the resistor 303 is inputted to the current detection circuit 321. An amplifier 326 of the current detection circuit 321 outputs a voltage corresponding to this voltage difference. A comparator 324 compares the output voltage of the amplifier 326 with a voltage of a constant voltage source 322 corresponding to an upper limit current value I20max, and outputs an ON signal when the output voltage of the amplifier 326 exceeds the voltage of the constant voltage source 322. A comparator 325 compares the output voltage of the amplifier 326 with a voltage of a constant voltage source 323 corresponding to −I20max as a sign inversion value of the upper limit current value I20max, and outputs an ON signal when the output voltage of the amplifier 326 is lower than the voltage of the constant voltage source 323.

A comparator 334a provided to the voltage detection circuit 331 compares the voltage of the main power source line 31a with the voltage of the constant voltage source 33a the voltage of which is set to the upper limit voltage value E20max, and outputs an ON signal when the voltage of the main power source line 31a exceeds the upper limit voltage value E20max. On the other hand, a comparator 335a compares the voltage of the main power source line 31a with the voltage of the constant voltage source 33a the voltage of which is set to the lower limit voltage value E20min, and outputs an ON signal when the voltage of the main power source line 31a is lower than the lower limit voltage value E20min.

The cutoff judgment circuit 312a outputs an ON signal when at least one of the output signal of the current detection circuit 321 and the output signal of the voltage detection circuit 331a is ON. When the output signal of the cutoff judgment circuit 312a is ON, the transistor 313a supplies the current to the relay switch 301 and changes over the relay switch 301 to the cutoff state.

A comparator 334b provided to the voltage detection circuit 331b compares the voltage of the main power source line 31b with the voltage of the constant voltage source 332b the voltage of which is set to the upper limit voltage value E20max, and outputs an ON signal when the voltage of the main power source line 31*b* exceeds the upper limit voltage value E20max. On the other hand, a comparator 335*b* compares the voltage of the main power source line 31*b* with the voltage of the constant voltage source 333*b* the voltage of which is set to the lower limit voltage value E20min, and outputs an ON signal when the voltage of the main power source line 31*b* is lower than the lower limit voltage value E20min.

The cutoff judgment circuit 312*b* outputs an ON signal when at least one of the output signals of the current detection circuit 331*a* is ON. When the output signal of the cutoff judgment circuit 312*b* is ON, the transistor 313*b* supplies the current to the relay switch 301 and changes over the relay switch 301 to the cutoff state.

Because power of the main power source line 31*b* is supplied to the voltage detection circuit 331*a*, connection/ cutoff control can be continued even when any abnormality develops in the main power source line 31*a* and the relay switch 301 is cut off. Therefore, when the main power source line 31*a* returns to the normal state, the relay switch 301 can be returned to the connection state. Because power of the main power source line 31*a* is supplied to the voltage detection circuit 331*b*, connection/cutoff control can be continued even when any abnormality develops in the main power source line 31*b* and the relay switch 301 is cut off. Therefore, when the main power source line 31*b* returns to the normal state, the relay switch 301 can be returned to the connection state. In consequence, when the normal state is recovered, all the brake motors can be automatically returned to the operable condition, and the main power breaker 20 having high reliability can be accomplished.

The fusing current value of the fuse 302 is set to a value greater than the upper limit current value I20 max. When the relay switch 301 is not cut off as expected even though a current greater than the upper limit current value I20 max flows through the main power source line 31, the fuse 302 is fused. Consequently, the main power breaker 20 that can conduct more reliably the cutoff operation than when the fuse 302 does not exist can be accomplished.

Figure 2:
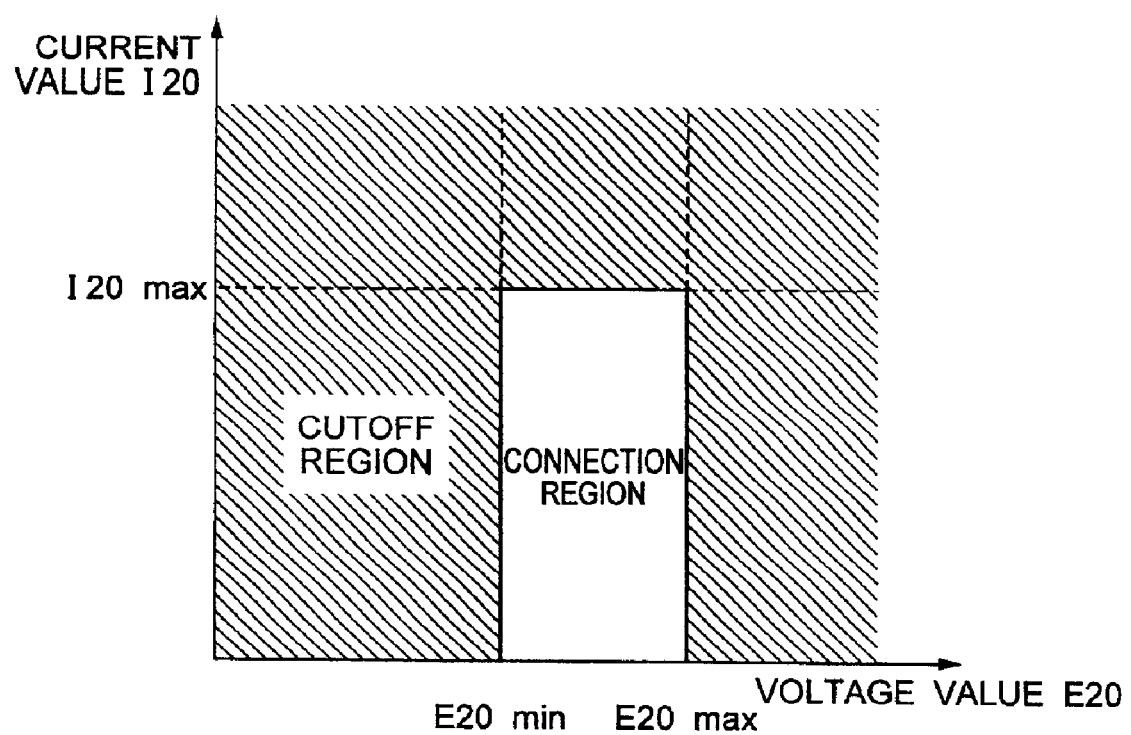
FIG. 2 is a diagram showing a connection/cutoff region of a main power breaker 20.

FIG. 2 shows a connection region and a cutoff region of the main power breaker 20. The condition in which the main power breaker 20 conducts the cutoff control is the case where the current value I20 supplied exceeds a predetermined upper limit current value I20max, or the case where the voltage value E20 is lower than a predetermined lower limit voltage value E20min or exceeds a predetermined upper limit voltage value E20max. The case where the current value I20 exceeds the current value I20max is, for example, the case where a part of the power supply system is grounded and an excessive current flows through the main power breaker 20. The case where the voltage value E20 is lower than the lower limit voltage value E20min is, for example, the case where a part of the power supply system is grounded and the voltage of the main power source line 31 drops to the ground level. The case where the voltage value E20 exceeds the upper limit voltage value E20max is, for example, the case where an abnormal voltage develops at a part of the power supply system.

When the brake calipers 2*a* and 2*b* of the front wheels are connected to the main power source line 31*a* and the brake calipers 2*c* and 2*d* of the rear wheels are connected to the main power source line 31*b*, the length of the electric wiring can be reduced much more than the diagonal construction in which the brake calipers of the right front wheel and the left rear wheel are connected to the main power source line 31*a* and the brake calipers of the left front wheel and the right rear wheel are connected to the main power source line 31*b*. On the other hand, in the case of the diagonal wiring where the brake calipers of the right front wheel and the left rear wheel are connected to the main power source line 31*a* and the brake calipers of the left front wheel and the right rear wheel are connected to the main power source line 31*b*, sufficient braking force can be secured even in a vehicle in which the weight applied to the front wheels is extremely greater than the weight applied to the rear wheels because the situation in which only the rear wheels having low braking capacity become operable can be avoided.

A converter 13 is connected to the main power source line 31*a*. A low voltage power source line 32 is connected to the converter 13. A low voltage battery 12 is connected to the low voltage power source line 32. The converter 13 is the device that conducts voltage conversion and power supply from the main power source line 31 to the low voltage power source line 32, or from the low voltage power source line 32 to the main power source line 31. The low voltage battery 12 is a power source that normally stores electric energy and supplies power to a load, not shown, using a low voltage power as driving power. The low voltage battery 12 supplies power to the driving circuits 4*a* to 4*d* through the converter 13 when the high voltage battery 11 fails to supply sufficient power to these driving circuits 4*a* to 4*d*. When the driving voltage of the brake motors 1*a* to 1*d* is higher than the driving voltage of apparatuses mounted to the vehicle other than the brake motors, power can be stably supplied to those apparatuses which need low voltage power because the power supply of a voltage lower than the voltage of the power source supplied to the driving circuits 4*a* to 4*d* and the power source line are provided. Since it is not necessary to provide a plurality of high voltage batteries to cope with the driving voltages of the brake motors 1*a* to 1*d*, an economical power supply system can be provided. The low voltage battery is, for example, a 12 V battery. Apparatuses using a 12 V battery and power of 12 V as driving power have been used widely.

An inverter 15 is connected to the main power source line 31*a*. A generator 14 is connected to this inverter 15. The generator 14 is an alternator, for example. It rotates with the revolution of an engine, not shown, and outputs AC power. The inverter 15 inverts AC power outputted from the generator 14 to DC power of a predetermined voltage. The high voltage battery 11 stores power outputted from the inverter 15. The low voltage battery 12 stores power that is voltage-converted by the converter 13.

A load 19 other than the electrically driven brake device calling for a high voltage is connected to the high voltage battery side of the main power source line 31*b* from the junction of the secondary power source lines 33*c* and 33*d*. As the load 19 is thus connected on the high voltage battery side of the main power source line 31*b*, the high voltage battery 11 can buffer the voltage fluctuation resulting from power consumption of the load 19. Therefore, a stable voltage can be supplied to the brake motors 1*a* to 1*d*, and an electrically driven brake device having high reliability can be provided.

A pedal sensor 42 and a driving condition sensor 45 are connected to the control apparatus 43. A pedal sensor 50 outputs an electric signal corresponding to a step-in quantity of a brake pedal 41. The driving condition sensor 45 detects, for example, a vehicle speed, a vehicle acceleration, a turning angular speed of the vehicle, a rotating speed of each wheel, a slip condition of each wheel, throttle opening of the engine, a steering angle of a steering gear, a headway distance to a vehicle running ahead and its relative speed, existence/absence of any obstacle, a road gradient, and so forth, and sends an electric signal corresponding to each driving condition to the controller 10. The control apparatus 43 determines the magnitude of braking force required by the driver on the basis of the output signals of the pedal sensor 42 and the driving condition sensor 45.

In the electrically driven brake device according to this embodiment, the high voltage battery 11 as the power supply normally drives each brake motor 1a to 1d. When abnormality such as grounding or disconnection develops in the main power source line 31 or in the secondary power source lines 33a to 33d or in the apparatus connected to these power source lines, each brake motor 1a to 1d cannot operate in some cases. When any such abnormality occurs in the main power source line 31 or in the secondary power source lines 33a to 33d or in the apparatus connected to these power source lines, the electrically driven brake device according to this embodiment can secure at least two brake motors that control the connection/cutoff state of the main power source breaker 20 or the secondary power source breakers 21a to 21d to insulate and separate the fault portion from the normal portion, and can operate normally. Further, the electrically driven brake device of this embodiment does not require a plurality of high voltage batteries as a power supply for the electrically driven brake device, and a power source line and a converter that are used only at the occurrence of abnormality. Therefore, an economical electrically driven brake device can be accomplished.

Next, the operation of the electrically driven brake device having the construction described above will be explained.

[A-(1): Normal Operation]

The control apparatus 43 judges whether or not the brake pedal 41 is stepped on the basis of the output signals of the pedal sensor 42 and the driving condition sensor 45, and judges whether or not the braking request is generated. When judging that the braking request is generated, the control apparatus 43 computes target braking force of each wheel on the basis of the output signals of the pedal sensor 42 and the driving condition sensor 45 so that braking force control during stable driving, anti-lock brake control, traction control, vehicle posture control and distance control with vehicles running ahead, for example, can be accomplished. The control apparatus 43 then outputs the signal corresponding to target braking force to the driving circuits 4a to 4d.

Each driving circuit 4a to 4d drives the corresponding brake motor 1a to 1d so that braking force of each wheel attains target braking force. The high voltage battery 11 supplies power to the brake motor 1a to 1d through the main power source line 31, the secondary power source line 33a to 33d and the driving circuit 4a to 4d. At this time, the main power breaker 20 and the secondary power breaker 21a to 21d remain under the connection state.

Since sufficient power can be supplied from the high voltage battery 11 to the brake motor 1a to 1d as described above, braking force required by the driver can be generated.

[A-(2): In Abnormal]

Hereinafter, the explanation will be given on the case where any abnormality develops in the main power source line 31 or in the secondary power source lines 33a to 33d or in the apparatuses connected to these power source lines. The operation when abnormality develops in the apparatus connected to each power source line is conducted in the same way as when abnormality develops in each power source line. Therefore, the explanation of such an operation will be omitted. When abnormality is detected, the control apparatus 43 quickly warns the driver through an alarm lamp or warning sound, and limits the operation of the vehicle lest the vehicle enters a critical condition. When the vehicle is under driving, for example, the control apparatus 43 controls driving force lest the vehicle is accelerated, and decelerates the vehicle by using an auxiliary brake such as engine brake or a load torque. When the vehicle is at halt, the control apparatus 43 limits driving lest the vehicle can start.

Figure 3:
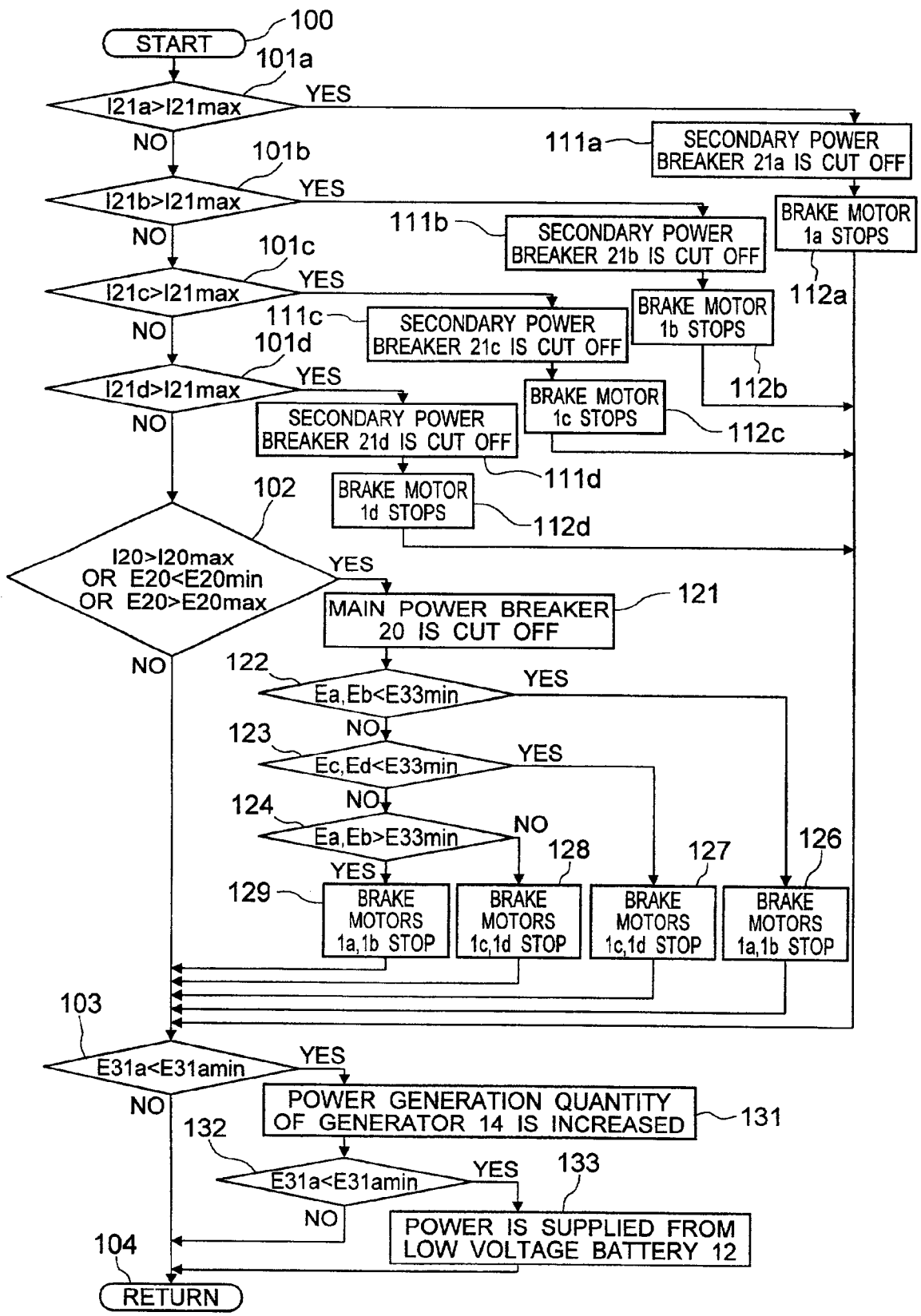
FIG. 3 is a flowchart showing the operation of the first embodiment of the present invention.

FIG. 3 shows the operation flow when abnormality develops.

Abnormality detection is started from Operation 100.

In Condition 101a to 101d shown in FIG. 3, when grounding occurs in the secondary power source line 33a to 33d and the current value I21a to I21d of the secondary power breaker 21a to 21d becomes greater than the predetermined upper limit current value I21max, the flow proceeds to Operation 111a to 111d, and the secondary power breaker 21a to 21d is changed over to the cutoff state. Subsequently, the corresponding brake motor comes to halt in Operation 112a to 112d. The flow then proceeds to condition 103.

When Condition 101a to 101d is not satisfied, the flow proceeds to Condition 102, and the conditions of the current and the voltage of the main power breaker 20 are judged. When grounding develops in the main power source line 31 and the current value I20 of the main current breaker 20 becomes greater than the predetermined upper limit value I20max, or when an abnormally high voltage develops in the main power source line 31 and the voltage value E20 of the main power breaker 20 becomes greater than the predetermined upper limit voltage value E20max, or when an abnormally low voltage occurs in the main power source line 31 and the voltage value E20 of the main power breaker 20 becomes smaller than the predetermined lower limit voltage value E20min, the flow proceeds from Condition 102 to Operation 121, and the main power breaker 20 is switched to the cutoff state. The flow proceeds to Condition 103 at other times, and the voltage condition of the main power breaker 31a is judged.

The flow proceeds from Operation 121 to Condition 122 to 124, and the driving device 4a to 4d detects the voltage value Ea to Ed of the secondary power source line 33a to 33d. When grounding develops in the main power source line 31a or in the secondary power source line 33a, 33b or when these power source lines are under an abnormally low voltage condition in Condition 122, the voltage value Ea, Eb of the secondary power source line 33a, 33b becomes smaller than the predetermined low limit voltage value E33min, and the brake motor 1a, 1b comes to halt in Operation 126. When grounding develops in the main power source line 31b or in the secondary power source line 33c, 33d or when these power source lines are under an abnormally low voltage condition in Condition 123, the voltage value Ec, Ed of the secondary power source line 33c, 33d becomes smaller than the predetermined low limit voltage value E33min, and the brake motor 1c, 1d comes to halt in Operation 127. When the main power source line 31a or the secondary power source lines 33a, 33b is under the abnormally high voltage condition in Condition 124, the voltage value Ea, Eb of the secondary power source line 33a, 33b becomes greater than the predetermined upper limit voltage value E33max, and the brake motor 1a, 1b comes to halt in Operation 129. When the main power source line 31b or the secondary power source lines 33c, 33d is under the abnormally high voltage condition in Condition 124, the voltage value Ec, Ed of the secondary power source line 33c, 33d becomes smaller than the predetermined upper limit voltage value E33max, and the brake motor 1c, 1d comes to halt in Operation 128. The flow proceeds from Operation 126 to 129 to Condition 103.

In Condition 103, the comparator 13 detects the voltage value E31a of the main power breaker 31a, and when the detected voltage is greater than the predetermined voltage value E31amin, the flow proceeds to 104, and abnormality detection is repeated. When the voltage value E31a is smaller than the voltage value E31amin, the flow proceeds to Operation 131 and the power quantity of the generator 14 is increased. When the voltage value E31a is greater than the voltage value E31amin in Condition 132, the flow proceeds to 104 and abnormality detection is repeated. When the voltage value E31a is smaller than the voltage value E31amin, the flow proceeds to Operation 133 and the low voltage battery 12 supplies power to the main power source line 31a. The flow then proceeds to 104 and abnormality detection is repeated.

The operation at the time of the occurrence of abnormality will be explained dividedly about the cases where insufficiency of the power supply, grounding and disconnection develop, respectively.

[A-(2)-a: Shortage of Supplied Power]

When the high voltage battery 11 is consumed and sufficient power cannot be supplied to the brake motor 1a to 1d, the generation quantity of the generator 14 is increased. However, when power supplied from the generator 14 is not sufficient, the converter 13 detects the voltage drop of the main power source line 31 due to consumption of the high voltage battery 11, elevates the voltage of the low voltage power source line 32 and supplies power to the main power source line 31. The operation flow at this time is represented by Condition 103a to Operation 104 in FIG. 3.

Therefore, since the low voltage battery 12 supplies power for making up for the shortage of power to the brake motor 1a to 1d, the brake motor 1a to 1d can keep the operable condition. In this way, even when supply power of the high voltage battery 11 becomes insufficient, the brake motor 1a to 1d can operate, and sufficient braking force can be secured.

[A-(2)-b: Disconnection]

When abnormality such as disconnection of a part of the main power source line 31 develops, power is supplied to the brake motors on the side of the high voltage battery from the disconnected portion in the same way as in the normal operation, but is not supplied to the brake motors on the converter side from the disconnection portion. At this time, power from the generator 14 is supplied to the brake motors on the converter side from the disconnected portion. When supply power from the generator 14 is not sufficient, however, the converter 13 detects the voltage drop of the main power source line 31a, elevates the voltage of the low voltage power source line 32 and supplies power to the main power source line 31. Therefore, power is supplied to the brake motor 1a to 1d from the high voltage battery 11 or from the generator 14 or from the low voltage battery 12, and the brake motor 1a to 1d can keep the operable condition.

When a part of the secondary power source line 33a to 33d is disconnected, the brake motor connected to the second power breaker so disconnected cannot operate, but three brake motors other than the disconnected brake motor can keep the operable condition.

As described above, even when the main power source line 31 or a part of the secondary power breaker 21a to 21d undergoes disconnection, at least three brake motors can operate. Therefore, sufficient braking force can be secured.

[A-(2)-c: Ground Fault]

When a part of the secondary power source lines 33a to 33d is grounded, a current greater than the normal current flows through the grounded secondary power source line. The secondary power breaker 21a to 21d detects this current and is then switched to the cutoff state. Since the current value in this cutoff condition is set to a lower current value than in the cutoff condition of the main power breaker 20, the main power breaker 20 can keep the connection state. Therefore, the brake motors, to which power is supplied from the power source lines other than the disconnected secondary power source line can keep the operable condition. Condition 101a to 101d, Operation 111a to 111d, Operation 112a to 112d and Condition 103 in FIG. 3 represent the operation flow at this time.

When a part of the main power source line 31a is grounded, that is, when a part of the main power source line is connected to the body earth of the vehicle, a current greater than the normal current flows to the portion so grounded from the high voltage battery 11 through the main power line 31b and through the main power breaker 20. The main power breaker 20 detects this current value and is switched to the cutoff state. Since no power is supplied to the brake motors 1a, 1b connected to the grounded main power source line 31a, these brake motors 1a, 1b cannot operate. On the other hand, since power is supplied from the high voltage battery 11 to the brake motor 1c, 1d connected to the main power source line 31b, the brake motor 1c, 1d can keep the operable condition. The operation flow from Condition 102 to Operation 126 represents the operation flow at this time.

When a part of the main power source line 31b is grounded, a current higher than the normal current flows from the generator 14 through the inverter 15, the main power source line 31a and the main power breaker 20. Detecting this current, the main power breaker 20 switches to the cutoff state. At this time, power from the generator 14 is supplied to the main power source line 31a. When power from the generator 14 is not sufficient, however, the converter 13 supplies power of the battery 12 to the main power source line 31a. Since power is not supplied to the brake motor 1c, 1d connected to the grounded main power source line 31b, the brake motor 1c, 1d cannot operate. On the other hand, since the generator 14 or the low voltage battery 12 supplies power to the brake motors 1a, 1b connected to the main power source line 31a, the brake motors 1a, 1b can keep the operable condition. The operation flow at this time is from Condition 102 to Operation 127 and from Condition 103 to Operation 104 in FIG. 3.

In other words, when a part of the main power source line 31a or a part of the main power source line 31b is grounded, the brake actuators are divided (insulation-divided) into at least two separate systems on the main power source line 31 as the main power breaker 20 is switched to the cutoff state, and braking force can be secured.

Even when the main power source line 31 or a part of the secondary power breaker 21a to 21d is grounded, at least two brake motors are operable, and sufficient braking force can be secured.

[A-(2)-d: Abnormal Voltage]

When a voltage higher or lower than the normal expected voltage or a voltage fluctuating abnormally develops in the main power source line 31, the main power breaker 20 detects the voltage value or current value generated by such a voltage and is switched to the cutoff state.

Each driving device 4a to 4d detects the voltage of the secondary power source line 33a to 33d. When any abnormal voltage develops at this time in the main power source line 31a, the operation of the brake motor 1a, 1b is stopped. Since normal power is supplied from the high voltage battery 11 to the brake motor 1c, 1d connected to the main power source line 31b, the brake motor 1c, 1d can keep the operable state. The operation flow at this time is the flows from Condition 102 to Operation 126 and from Condition 102 to Operation 129 in FIG. 3. On the other hand, when any abnormal voltage develops in the main power source line 31b, the operation of the brake motor 1c, 1d is stopped. Further, the converter 13 supplies power of the battery 12 to the main power source line 31a. Since normal power is supplied from the low voltage battery 12 to the brake motor 1a, 1b connected to the main power source line 31a, these brake motors 1a, 1b can keep the operable state. The operation flow at this time is the flows from Condition 102 to Operation 127 and from Condition 102 to Operation 128 in FIG. 3. The similar operation is conducted when any abnormal voltage develops at a part of the secondary power source line 33a to 33d.

As described above, even when any abnormal voltage develops in the main power source line 31 or in a part of the secondary power breaker 21a to 21d, the brake motors 1a, 1b or 1c, 1d are operable, and sufficient braking force can be secured.

According to the operations described above, the power source system in which any abnormality develops is insulated and separated when disconnection, grounding or an abnormal voltage develops in the main power source line or in the secondary power source line 33a to 33d, and power is supplied from the low voltage battery 32 when the high voltage battery 31 is consumed. In consequence, at least one power supply source having sufficient power supply capacity is connected to at least two brake motors. In other words, since at least two brake motors can keep the operable state, sufficient braking force can be secured, and an electrically driven brake device having high reliability can be accomplished.

In the embodiment described above, the electrically driven brake device includes the high voltage battery 11 and the low voltage battery 12 as the power supply source. However, these batteries are not particularly limited to the high voltage battery 11 and the low voltage battery 12. For example, two power supply sources may be the batteries having an equal voltage. When the vehicle does not include a low voltage power source, a converter for converting the voltage is not necessary, and an electrically driven brake device that is more economical can be accomplished. Even when the vehicle includes a low voltage power source, the converter needs to have only a voltage reducing function as the voltage conversion function. Therefore, an electrically driven brake device that is more economical can be provided.

Next, the second embodiment of the present invention will be explained with reference to FIG. 4.

Figure 4:
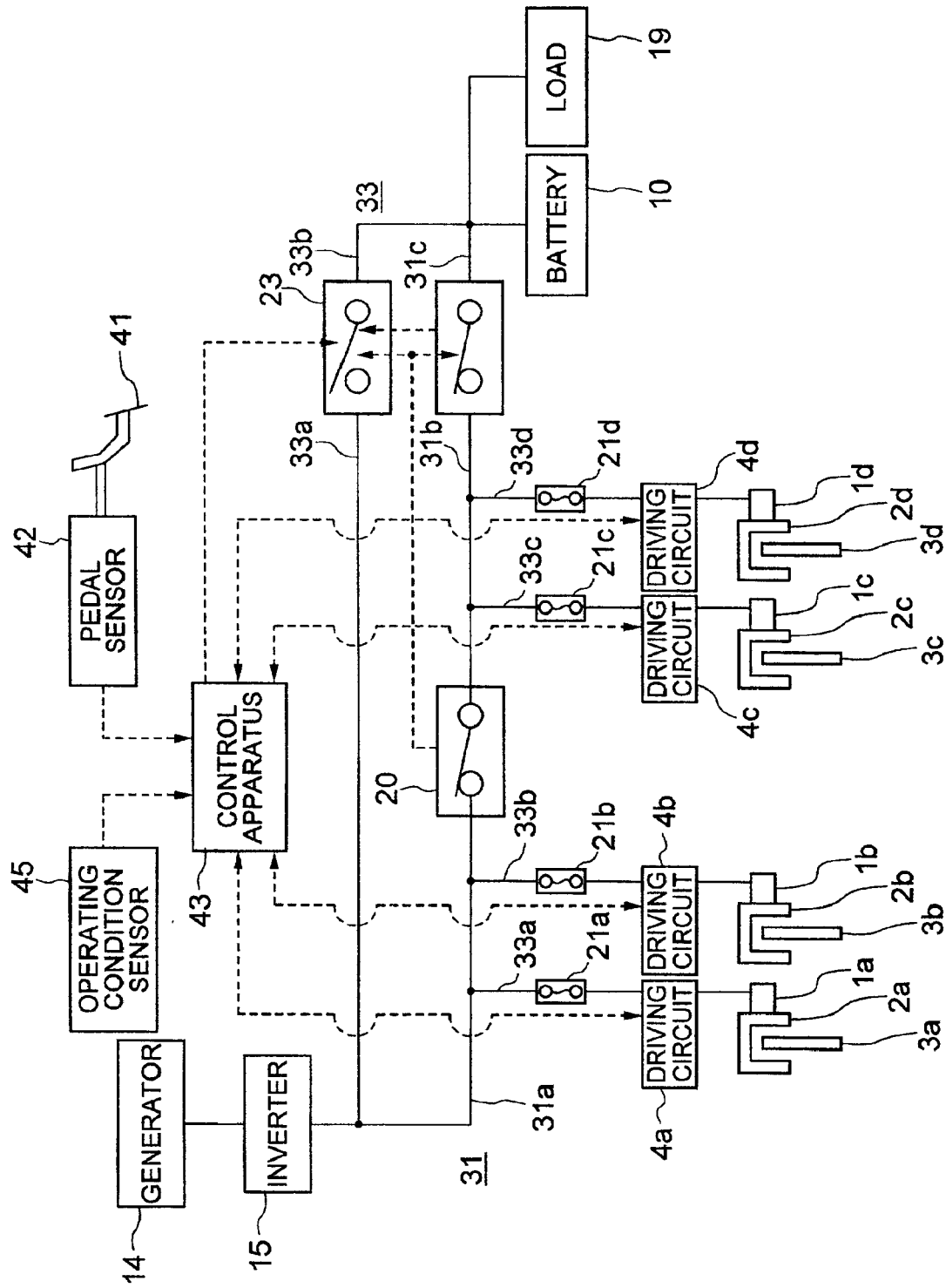
FIG. 4 is a system structural view of an electrically driven brake device according to a second embodiment of the present invention.

FIG. 4 shows a system structural view of the second embodiment of the present invention. The electrically driven brake device of this embodiment includes one battery as the power supply source for supplying power to the brake actuators, and a plurality of power breakers in the main power source line so that the operation of at least two actuators can be secured even when any abnormality develops at a part of the main power source line. Incidentally, like reference numerals will be used in FIG. 4 to identify like constituent portions as in FIG. 1, and the explanation of such constituent members will be omitted or simplified.

A battery 10 is connected to the main power source line 31. The battery 10 is the power supply source that supplies power to the driving circuit 4a to 4d. Main power breakers 20 and 22 for switching and controlling the connection/cutoff state are disposed in the main power source line 31. The main power source line 31 includes a main power source line 31a to which secondary power source lines 33a and 33b are connected, a main power source line 31b to which secondary power source lines 33c and 33d are connected, a main power source line 31c to which a battery is connected, a main power breaker 20 for connecting the main power source line 31a to the main power source line 31b and a main power breaker 22 for connecting the main power source line 31b to the main power source line 31c. The main power breaker 22 is an electronic control switch for switching and controlling the connection/cutoff state of a built-in relay switch in accordance with the current or voltage value to be detected. An auxiliary power breaker 23 is an electronic control switch for switching the connection/cutoff state on the basis of an instruction signal given from the control apparatus 43.

An auxiliary power source line 33a is connected to the main power source line 31a. An auxiliary power source line 33b is connected to the battery 10. The auxiliary power source line 33 includes the auxiliary power source line 33a, the auxiliary power source line 33b and an auxiliary power breaker 23 for connecting the auxiliary power source line 33a to the auxiliary power source line 33b.

When any abnormality develops in the main power source line 31 and in the secondary power source line 33a to 33d, the electrically driven brake device of this embodiment controls the main power breaker 20, 22 or the auxiliary power breaker 23 or the secondary power breaker 21a to 21d, insulates and separates the abnormal position and can secure at least two brake motors that can operate normally.

Next, the operation of the electrically driven brake device having the construction described above will be explained.

[B-(1): Normal Operation]

The electrically driven brake device operates at normal times in the same way as in the first embodiment.

[B-(2): Abnormal Operation]

Figure 5:
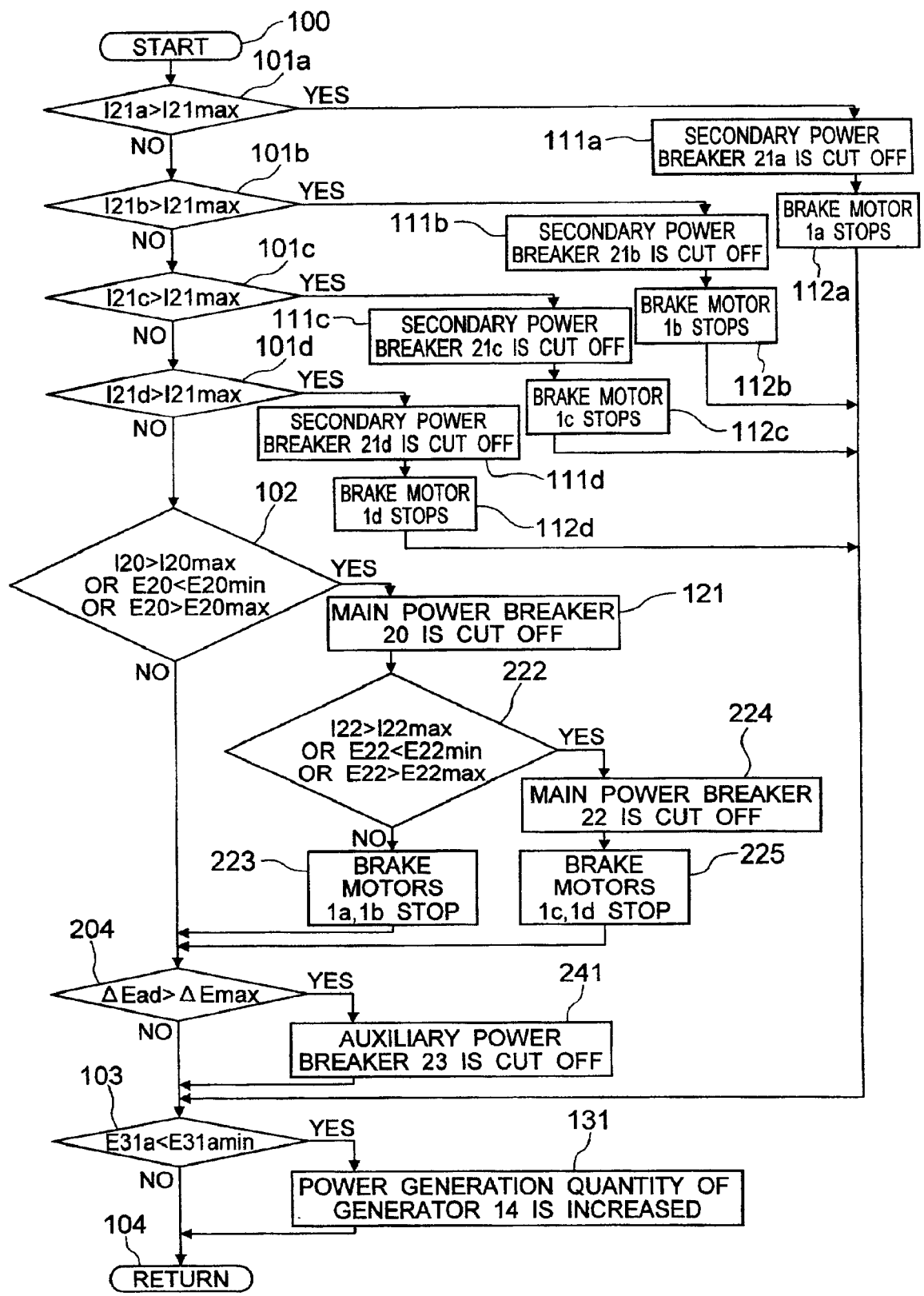
FIG. 5 is a flowchart showing the operation of the second embodiment of the present invention.

FIG. 5 shows the operation flow at the time of the occurrence of abnormality.

Operation 100, Condition 101a to 10d, Operation 111a to 111d, Operation 112a to 112d and Condition 102 in FIG. 5 are the same as those of the first embodiment.

When the main power breaker 20 is switched to the cutoff state in Operation 221, the operation flow proceeds to Condition 222, and the condition of the current value and the voltage value of the main power breaker 22 is judged. When grounding develops in the main power source line 31 and the current value I22 of the main power breaker 22 exceeds a predetermined upper limit current value I22max, or when any abnormally high voltage develops in the main power source line 31b and the voltage value E22 of the main power breaker 22 exceeds a predetermined upper limit voltage value E22max, or when any abnormally low voltage develops in the main power source line 31b and the voltage value E22 of the main power breaker 22 is smaller than a predetermined lower limit voltage value E22min, the operation flow proceeds from Condition 222 to Operation 224, and the main power breaker 22 is switched to the cutoff state. The cases other than the above are the cases where abnormality develops in the main power source line 31a. The flow proceeds to Operation 223 at this time, and the brake motor 1a, 1b comes to halt. When the flow proceeds to Operation 224, it is the case where any abnormality develops in the main power source line 31b, and the brake motor 1c, 1d comes to halt in Operation 225. Subsequently, the operation flow proceeds to Condition 204.

In Condition 204, the control apparatus 43 compares the voltage value Ea to Ed of the secondary power source line 33a to 33d detected by the driving device 4a to 4d. When the maximum value ΔEad among the voltage difference absolute value of the voltage values Ea to Ed is greater than a predetermined upper limit value ΔEmax, the flow proceeds to Operation 241, and to Condition 103 at other times. In Operation 241, the main power source line 31 is judged as being disconnected, and the auxiliary power breaker 23 is switched to the connection state. The flow then proceeds to Condition 103.

In Condition 103, the converter 13 detects the condition of the voltage value E31a of the main power breaker 31a. When the voltage value E31a is greater than a predetermined voltage value E31amin, the flow proceeds to Operation 104 and abnormality detection is repeated. When the voltage value E31a is smaller than the voltage value E31amin, the flow proceeds to Operation 131 and the power quantity of the generator 14 is increased. The flow then proceeds to Operation 104 and abnormality detection is repeated.

[B-(2)-a: Shortage of Supplied Power]

When the battery 10 is consumed and sufficient power cannot be supplied to the brake motor 1a to 1d, the power generation quantity of the generator 14 is increased and power is supplied from the inverter 15. To increase the power generation quantity of the generator 14, the rotational speed of the engine is increased while the connection between the engine and the wheels is kept disconnected. In consequence, the brake motor 1a to d can keep the operable condition. In this way, even when supply power of the battery 10 is insufficient, the brake motor 1a to 1d can operate, and sufficient braking force can be secured. Condition 103, Operation 131 and Operation 104 in FIG. 5 represent the operation flow at this time.

[B-(2)-b: Disconnection]

Next, the explanation will be given on the occurrence of abnormality, that is, disconnection of a part of the main power source line 31. The driving device 4a to 4d detects the voltage of the secondary power source line 33a to 33d and sends a signal corresponding to the voltage value to the control apparatus 43. The control apparatus 43 compares the voltages of the secondary power source lines 33a to 33d. When the difference of these voltages is greater than a predetermined value, it judges that the main power source line 31 is disconnected. At this time, the control apparatus 43 switches the auxiliary power source breaker 23 to the connection state. Therefore, since the battery 10 supplies power to the brake motors 1a to 1d, the brake motors 1a to 1d can keep the operable condition. Since the brake motors 1a to 1d can operate even when the main power source line 31 is disconnected, sufficient braking force can be secured. Condition 204 and Operation 142 in FIG. 5 represent the operation flow at this time.

[B-(2)-c: Ground Fault]

When a part of the main power source line 31a is grounded, a current greater than the normal current flows from the battery 10 to the grounded position through the main power breaker 22, the main power source line 31b and the main power breaker 20. Detecting this current value, the main power breaker 20 is switched to the cutoff state. Since power is not supplied to the brake motors 1a, 1b, these brake motors 1a, 1b cannot operate. Since the battery 10 supplies power to the brake motors 1c, 1d, on the other hand, these brake motors 1c, 1d can keep the operable condition. Condition 102, Operation 221, Condition 222 and Operation 223 in FIG. 5 represent the operation flow at this time.

When a part of the main power source line 31b is grounded, a current greater than the normal current flows from the generator 14 to the grounded position through the inverter 15, the main power source line 31a and the main power breaker 20. Detecting this current, the main power breaker 20 is switched to the cutoff state. A current greater than the normal current flows from the battery 10 to the grounded position through the main power breaker 22. Detecting this current, the main power breaker 22 is switched to the cutoff state. The control apparatus 43 compares the voltages of the secondary power source lines 33b and 33c. When the difference of these voltages is greater than a predetermined value, it judges that the main power breaker 20 is disconnected. At this time, the control apparatus 43 switches the auxiliary power source breaker 23 to the connection state. Therefore, since power is not supplied to the brake motors 1c and 1d connected to the grounded main power source line 31b, these brake motors 1c and 1d cannot keep the operable condition. On the other hand, since the battery 10 supplies power to the brake motors 1a and 1b connected to the main power source line 31a, these brake motors 1a and 1b can keep the operable condition. The operation flow from Condition 102 to Operation 221, Condition 222, Operation 224, Operation 225, Condition 204 and Operation 241 in FIG. 5 represent the operation flow at this time.

When a part of the secondary power source line 33a to 33d is grounded, the operation is conducted in the same way as in the first embodiment.

In this way, even when the main power source line 31 or a part of the secondary power breaker 21a to 21d is grounded, at least two brake motors can operate, and sufficient braking force can be secured.

[B-(2)-d: Abnormal Voltage]

When a voltage higher or lower than the normal expected voltage or a voltage abnormally fluctuating develops in the main power source line 31, the main power breaker 20 detects the voltage value or current value generated by such a voltage and is switched to the cutoff state. The control apparatus 43 judges the existence/absence of the abnormal voltage on the basis of the voltage value of the secondary power source line 33a to 33d detected by the driving device 4a to 4d. When the abnormal voltage develops at this time in the main power source line 31a, the operation of the brake motors 1a and 1b is stopped. Since the battery 10 supplies normal power at this time to the brake motors 1c and 1d connected to the main power source line 31b, these brake motors 1c and 1d can keep the operable condition. The flow from Condition 102, Operation 221, Condition 222 and Operation 223 in FIG. 5 represent the operation flows at this time.

When the abnormal voltage develops in the main power source line 31b, on the other hand, the operation of the brake motors 1c and 1d is stopped. Further, the main power breaker 22 detects the abnormal voltage or the current value occurring in the abnormal voltage of the main power source line 31b and is switched to the cutoff state. The auxiliary power breaker 23 detects the cutoff signal of the main power breaker 20 and the cutoff signal of the main power breaker 22 and is switched to the connection state. Consequently, since the battery 10 supplies normal power to the brake motors 1a and 1b connected to the main power source line 31a, these brake motors 1a and 1b can keep the operable state. The operation flow from Condition 102 to Operation 221, Condition 222, Operation 224, Operation 225, Condition 204 and Operation 241 in FIG. 5 represents the operation flows at this time.

When the abnormal voltage develops at a part of the secondary power source line 33a to 33d, too, the operation is conducted in the same way as when the abnormal voltage develops in the main power source line.

As described above, even when the abnormal voltage develops in the main power source line 31, the brake motor 1a, 1b or the brake motor 1c, 1d can secure braking force, and an electrically driven brake device having high reliability can be accomplished.

The second embodiment described above operates in such a fashion that when disconnection, ground fault or the abnormal voltage develops in the main power source line 31 or in the secondary power source line 33a to 33d, the power source system in which abnormality develops is insulated and separated, and when the battery 10 is consumed, the power generation quantity is increased to supply power to at least two brake motors. In consequence, at least two brake motors can keep the operable condition, sufficient braking force can be secured, and an electrically driven brake device having high reliability can be accomplished.

Though the first and second embodiments represent the power supply system of the electrically driven brake device, they can be easily applied to apparatuses other than the brake that need reliable power supply. For example, these embodiments can be applied to a power supply system of an electrically driven power steering apparatus having an electric motor.

In the first and second embodiment described above, each main power breaker 20, 22 is the electronic control switch, but it may well be a fuse or a breaker. In such a case, a more economical main power breaker 20, 22 can be provided.

In the first and second embodiment described above, the main power breaker 20 detects the current or the voltage of the main power supply line 31 and judges the occurrence of abnormality. However, abnormality judgment may be conducted by using an external device. It is possible, for example, to employ a construction in which the control apparatus 43 and the driving device 4a to 4d detect abnormality in the power supply system and control the connection/cutoff state of the main power breaker 20. When the control apparatus 43 having a high computation capacity and the driving device 4a to 4d conduct abnormality judgment and connection/cutoff control, the cutoff condition can be set more minutely.

The first and second embodiments described above use the current value and the voltage value of the main current breaker 20 as the judgment condition for the cutoff control of the main power breaker 20. However, detection may be based on the operating condition of the brake motor 1a to 1d such as an operation delay time. Consequently, cutoff control can be conducted on the basis of the operation information of the brake motor 1a to 1d that directly affects braking performance of the vehicle.

The first and second embodiments described above use the battery as the power supply source, but the power supply source is not particularly limited to the battery. For example, it is possible to use a capacitor as the power supply source. When a power supply source having different charge/discharge characteristics from those of the battery, the electrically driven brake device can cope with the power consumption condition of a broader range.

The first and second embodiments described above use the alternator as the generator, but the generator is not particularly limited to the alternator. It is also possible, for example, to use a motor generator capable of generating both power and electricity in place of the generator. In such a case, deceleration by means other than the brake actuator can be made during deceleration of the vehicle. Since regeneration of energy can be made, too, an electrically driven brake device having higher reliability and higher fuel saving performance can be provided. It is also possible to use a fuel cell as the generator. In this case, power can be supplied during the stop of the vehicle, too, without operating the power source such as the engine. In this case, the fuel cell can be handled as the power supply source that stores electric energy and supplies power to the brake actuator.

As described above, the electrically driven brake device according to the present invention separates the abnormal position when such abnormality develops in the power supply system, and secures the electric actuator that can operate normally. Therefore, the present invention can provide an electrically driven brake device having high reliability and capable of supplying sufficient power to the electrically driven actuator even when abnormality develops in the power supply system.

It will be further understood by those skilled in the art that the foregoing description has been made on embodiments of the invention and that various changes and modifications may be made in the invention without departing from the spirit of the invention and scope of the appended claims.

What is claimed is:

1. An electrically driven brake device comprising:
a plurality of brake actuators to generate braking force when driven electrically;
a power supply source to store electric energy and supply electric power to the brake actuators;
power source lines to connect the power supply source and the brake actuators;
a power breaker provided to selectably connect the power source lines, and to selectably disconnect the power source lines during times when the power supply source is unreliable, so as to insulate and separate the plurality of brake actuators into at least two systems;
an auxiliary power supply source to store electric energy and supply electric power to brake actuators of one system of the at least two systems during the times when the power supply source is unreliable, wherein the power supply source and the auxiliary power supply source provide power at mutually different voltage levels; and
a converter to convert a voltage level of the auxiliary power supply source to substantially a voltage level of the power supply source, and to apply a thus converted voltage level to the one system.

2. An electrically driven brake device according to claim 1, wherein the power breaker includes a cutoff switch for separating the power source lines into a first power source line and a second power source line, a first voltage detection circuit for detecting a voltage of the first power source line and a second voltage detection circuit for detecting a voltage of the second power source line, the second power source line supplies driving electric power to the first voltage detection circuit, and the first power source line supplies driving electric power to the second voltage detection circuit.

3. An electrically driven brake device according to claim 1, wherein the power breaker includes an electric switch to conduct electric connection/cutoff control and a fuse type switch fused by thermal energy at a predetermined series position on the power source lines, and a current value at which the electric switch is brought into a cutoff state by an over-current is smaller than a current value at which the fuse type switch is brought into a cutoff state by an over-current.

4. An electrically driven brake device comprising:
a plurality of brake actuators to generate braking force when driven electrically;
a plurality of power supply sources to store electric energy and supply electric power to the brake actuators;
a main power source line to connect the plurality of power supply sources;
secondary power source line to connect the main power source line and the brake actuators;
a power breaker provided to selectably disconnect the main power source line during times when a power provided on the main power source line is unreliable, so as to insulate and separate the plurality of brake actuators into at least two systems;
an auxiliary power supply source to supply electric power to brake actuators of one system of the at least two systems during the times when the power provided on the main power source line is unreliable, wherein the power on the main source line and the auxiliary power supply source provide power at mutually different voltage levels; and
a converter to convert a voltage level of the auxiliary power supply source to substantially a normal voltage level of the main power source line, and to apply a thus converted voltage level to the one system.

5. An electrically driven brake device according to claim 4, wherein the power breaker includes a cutoff switch for separating the main power source line into a first power source line and a second power source line, a first voltage detection circuit for detecting a voltage of the first power source line and a second voltage detection circuit for detecting a voltage of the second power source line, the second power source line supplies driving electric power to the first voltage detection circuit, and the first power source line supplies driving electric power to the second voltage detection circuit.

6. An electrically driven brake device according to claim 4, wherein the power breaker includes an electric switch to conduct electric connection/cutoff control and a fuse type switch fused by thermal energy, at at least one predetermined series position on the power source line, and a current value at which the electric switch is brought into a cutoff state by an over-current is smaller than a current value at which the fuse type switch is brought into a cutoff state by an over-current.

7. An electrically driven brake device according to claim 4, wherein the plurality of power supply sources comprise a plurality of power supply sources having different voltages, a converter for conducting voltage conversion is disposed on the main power source line, and all of the secondary power source lines are connected to a high voltage side of the main power source line.

8. An electrically driven brake device according to claim 4, comprising a secondary power breaker switched to a cutoff state when an over-current is supplied thereto, on the secondary power source line, and wherein a current value at which the secondary power breaker is brought into a cutoff state is smaller than a current value of the cutoff condition of the power breaker on the main power source line.

9. An electrically driven brake device according to claim 1, wherein the auxiliary power supply source provides power at a lower voltage level than a voltage level of the power supply source.

10. An electrically driven brake device according to claim 9, wherein the converter boosts a voltage level of the auxiliary power supply source to substantially a voltage level of the power supply source, and to apply the thus converted voltage level to the one system.

11. An electrically driven brake device comprising:
a plurality of brake actuators to generate braking force when driven electrically;
a power supply source means for storing electric energy and supplying electric power to the brake actuators;
power source line means for connecting the power supply source means and the brake actuators;
a power breaker means for selectably connecting the power source line means, and for selectably disconnecting ones of power source lines of the power source line means during times when the power supply source is unreliable, so as to insulate and separate the plurality of brake actuators into at least two systems;
an auxiliary power supply source means for storing electric energy and supplying electric power to brake actuators of one system of the at least two systems during the times when the power supply source means is unreliable, wherein the power supply source means and the auxiliary power supply source means provide power at mutually different voltage levels; and
a converter means for converting a voltage level of the auxiliary power supply source means to substantially a voltage level of the power supply source means, and to apply a thus converted voltage level to the one system.

12. An electrically driven brake device according to claim 11, wherein the power breaker means includes a cutoff switch for separating the ones of the power source lines into a first power source line and a second power source line, a first voltage detection circuit for detecting a voltage of the first power source line and a second voltage detection circuit for detecting a voltage of the second power source line, the second power source line supplies driving electric power to the first voltage detection circuit, and the first power source line supplies driving electric power to the second voltage detection circuit.

13. An electrically driven brake device according to claim 11, wherein the power breaker means includes an electric switch to conduct electric connection/cutoff control and a fuse type switch fused by thermal energy at a predetermined series position on the power source lines, and a current value at which the electric switch is brought into a cutoff state by an over-current is smaller than a current value at which the fuse type switch is brought into a cutoff state by an over-current.

14. An electrically driven brake device according to claim 11, wherein the auxiliary power supply source means provides power at a lower voltage level than a voltage level of the power supply source means.

15. An electrically driven brake device according to claim 14, wherein the converter means boosts a voltage level of the auxiliary power supply source means to substantially a voltage level of the power supply source means, and to apply the thus converted voltage level to the one system.

16. A vehicle comprising:
at least one of a plurality of wheels; and
an electrically driven brake device including:
a plurality of brake actuators to generate braking force when driven electrically;
a power supply source to store electric enemy and supply electric power to the brake actuators;
power source lines to connect the power supply source and the brake actuators;
a power breaker provided to selectably connect the power source lines, and to selectably disconnect the power source lines during times when the power supply source is unreliable, so as to insulate and separate the plurality of brake actuators into at least two systems;

an auxiliary power supply source to store electric energy and supply electric power to brake actuators of one system of the at least two systems during the times when the power supply source is unreliable, wherein the power supply source and the auxiliary power supply source provide power at mutually different voltage levels; and a converter to convert a voltage level of the auxiliary power supply source to substantially a voltage level of the power supply source, and to apply a thus converted voltage level to the one system.

17. A vehicle according to claim 16, wherein the power breaker includes a cutoff switch for separating the power source lines into a first power source line and a second power source line, a first voltage detection circuit for detecting a voltage of the first power source line and a second voltage detection circuit for detecting a voltage of the second power source line, the second power source line supplies driving electric power to the first voltage detection circuit, and the first power source line supplies driving electric power to the second voltage detection circuit.

18. A vehicle according to claim 16, wherein the power breaker includes an electric switch to conduct electric connection/cutoff control and a fuse type switch fused by thermal energy at a predetermined series position on the power source lines, and a current value at which the electric switch is brought into a cutoff state by an over-current is smaller than a current value at which the fuse type switch is brought into a cutoff state by an over-current.

19. A vehicle according to claim 16, wherein the auxiliary power supply source provides power at a lower voltage level than a voltage level of the power supply source.

20. A vehicle according to claim 19, wherein the converter boosts a voltage level of the auxiliary power supply source to substantially a voltage level of the power supply source, and to apply the thus converted voltage level to the one system.

* * * * *